United States Patent
Grant

[15] 3,645,129
[45] Feb. 29, 1972

[54] METHOD FOR ANALYZING THE JOINDER BETWEEN A PAIR OF ABUTTING MEMBERS

[72] Inventor: Ralph M. Grant, Ann Arbor, Mich.
[73] Assignee: G. C. Optronics Inc., Ann Arbor, Mich.
[22] Filed: Mar. 18, 1968
[21] Appl. No.: 745,054

Related U.S. Application Data

[63] Continuation-in-part of Ser. No. 633,068, Apr. 24, 1967, abandoned.

[52] U.S. Cl. ................................... 73/67, 73/67.2, 73/71.3, 350/3.5
[51] Int. Cl. ........................................... G01n 29/04
[58] Field of Search ................. 73/67, 67.2, 67.5 H, 71.3; 350/3.5

[56] References Cited

UNITED STATES PATENTS

| | | | |
|---|---|---|---|
| 2,645,933 | 7/1953 | Arenberg | 73/67.8 |
| 3,226,975 | 1/1966 | Muller et al. | 73/67.2 |

OTHER PUBLICATIONS

Collier, R. J. et al., Application of Moire Techniques to Holography, Applied Physics Letters, Oct. 15, 1965, Vol. 7, No. 8, p. 223–225.

Powell R. L. et al., Interferometric Vibration Analysis by Wavefront Reconstruction, J.O.S.A., Vol. 55, No. 12, Dec. 1965 p. 1593–1598.

Laser Focus, Holographic Vibration Analysis Promising for Nondestructive Ultrasonic Testing, Sept. 1966, p. 29–31.

E. N. Leith et al., Holograms: Their Properties and Uses, S.P.I.E. Journal, Oct./Nov. 1965, pp. 3–6.

*Primary Examiner*—Richard C. Queisser
*Assistant Examiner*—John P. Beauchamp
*Attorney*—Hauke, Krass & Gifford

[57] ABSTRACT

A transducer induces vibrations into a member including at least a pair of members joined to one another along a common surface. An exposed section of the two members, which may or may not include one line of their joinder, is illuminated with a source of coherent light while it is being vibrated and a photographic plate is exposed to both the reflected light and the direct coherent light. The plate is developed to provide a hologram which is then properly illuminated to recreate a visual image of the surface section. The visual image will contain fringe lines and/or shaded areas as a result of interference between light waves reflected from the member at the high and low points of its vibration. Anomalies in these lines and areas will reveal discontinuities in the joinder between the two members which affect the pattern of vibration of the surface section.

8 Claims, 5 Drawing Figures

INVENTOR.
RALPH M. GRANT

BY Hauke, Krass, & Gifford

ATTORNEY

METHOD FOR ANALYZING THE JOINDER BETWEEN A PAIR OF ABUTTING MEMBERS

CROSS-REFERENCE TO RELATED APPLICATION

The present application is a continuation-in-part application of Ser. No. 633,068, filed Apr. 24, 1967, now abandoned.

BACKGROUND OF THE INVENTION

1. Field of the Invention

This invention relates to a nondestructive test method for determining the adherence between a pair of abutting members including inducing vibrations in the members; creating a hologram of the member as it undergoes vibration; and reconstructing and analyzing a visual image of the members from the hologram, such images including fringe lines and shaded areas representing the modes of vibration of the member.

2. Description of the Prior Art

Holography has previously been employed to analyze the vibration of normally vibrating devices such as loudspeaker cones. One of the several available techniques for forming a hologram, i.e., coherent holography or white light holography, have been applied to the member, while it is undergoing vibration, to form a hologram. The reconstructed image of the vibrating device contains a pattern of fringe lines as a result of the interference between the light reflected from the object to the photosensitive plate during its vibratory motion. An analysis of these fringe lines provides information as to the pattern of vibration of the member and the degree of flexure at any point, which is unobtainable by any other method, be it empirical or anlytical.

SUMMARY OF THE INVENTION

The present invention contemplates an extension and variation of the above method of analyzing vibratory structures which is useful to determine the degree of adhesion between a pair of members which abut one another along a common surface or line. These members may be intended to be adhered to one another, as in the case of a welded, brazed or chemically bonded joint, or may be intended to be simply abutting, but not bonded to one another. The members may be formed of the same or dissimilar materials and may be either rigid or elastic. In any of these situations the present method is capable of determining whether a bond exists between the members at all points along their interface and it may also be used to determine the degree of bond.

In order to practice the method vibrations are induced in the two members. In a limited class of cases the members will be part of a structure which normally undergoes vibration, such as the cone and frame of a loudspeaker. In such cases it is simply necessary to induce the vibration of the members by the usual means, such as providing an audio signal of the proper frequency and intensity to the speaker coil. In other cases the members will not be part of a normally vibrating structure and it is necessary to induce vibrations in them.

The method used to induce vibrations in the members is dependent upon their nature and configuration, and may take the form of contacting them with a vibrating transducer or coupling them to a vibrating transducer through a fluid medium, such as air or water. The frequency and intensity of the vibrations induced in the member are also a function of their nature and configuration and may vary over a wide range. A variable frequency oscillating mechanism might be employed to find a frequency which induces the most active vibrations in the members since generally the most vigorous vibrations would produce the best fringe lines in the visual image produced from the hologram. In certain applications it may be desirable to provide a number of holograms made of the same structure with inducing vibrations of different frequency or amplitude.

Any of the available methods may be employed to form a hologram of a section of the surface of the members while they are undergoing vibration. This surface section may either include part of the boundary between the members or will otherwise be sufficiently spatially and structurally related to their boundary so that anomalies along the joint will produce at least minute variations in the vibration of the surface section. In the practice of a preferred embodiment of the invention, which will subsequently be disclosed in detail, this section is illuminated with a coherent light which is reflected to a photographic plate that also receives direct illumination from the light source. Because of the spatial coherence between the direct and reflected light the plate will be exposed to the interference pattern between the two light sets. The exposure time of the plate is sufficient for the members to undergo at least one, and preferably a number of vibrations. The photographic plate will thus record the interference between the direct and reflected light at the two extremes of vibratory motion because of the time averaging feature of the photographic emulsion.

When developed, the hologram is appropriately illuminated, normally with coherent light, and an optical image of the section of the members holographed will be made visible, and will contain fringe line patterns based on the movement undergone during the vibrations. The spacing of the fringes in each region of the observed section will depend on the dimensions of the vibration which that section underwent and the fringes in particular areas may merge into greyings. The analytic method depends upon the concept that the vibrations will only be fully propagated across the interface at points where the two members are fully bonded to one another.

In certain simple structures where the observed section includes part of the interface, a single vibration mode may be set up and the fringe lines visible at this point on the boundary will be continuous. Where the members are merely abutting one another and not united, independent vibrations will be set up and the fringes at these points will be discontinuous across the boundary. Completely separate fringe systems may be set up on two sides of the boundary, or a fringe shift may be noted at the boundary. No experience is necessary to perform analysis of the boundary bond using these principles. After viewing one hologram it may be necessary to produce additional holograms with varying frequencies and intensities of vibrations imposed on the members in order to produce a fringe system which produces fringes at desired points at which analysis is to be performed.

In cases where the observed section does not include the interface being studied, but that interface is rather below the observed section, as in the case of two rectangular prisms bonded together wherein that bond must be studied from the surface of one of the prisms, the analytic method may be considered to depend on either vibration transmission across the interface, or the support of the observed surface by the interface, or combinations of the two. If the bond between the prisms is interrupted at a point, the mode of vibration of surface areas proximate to this point will differ from that of other surface areas. By performing the analysis over a range of frequencies, it is usually possible to find frequencies which excite either the bonded area or the unbonded area, but not both. At these frequencies distinct anomalies will appear in the fringe pattern of the part of the surface which is related to the unbonded area, thus revealing the bond failure.

The subsequent description details a preferred method of practicing the invention and apparatus suitable for such practice. Various objects, advantages and applications of the invention will be made apparent by the following detailed description, which makes reference to the accompanying drawings, in which.

Figure 1:
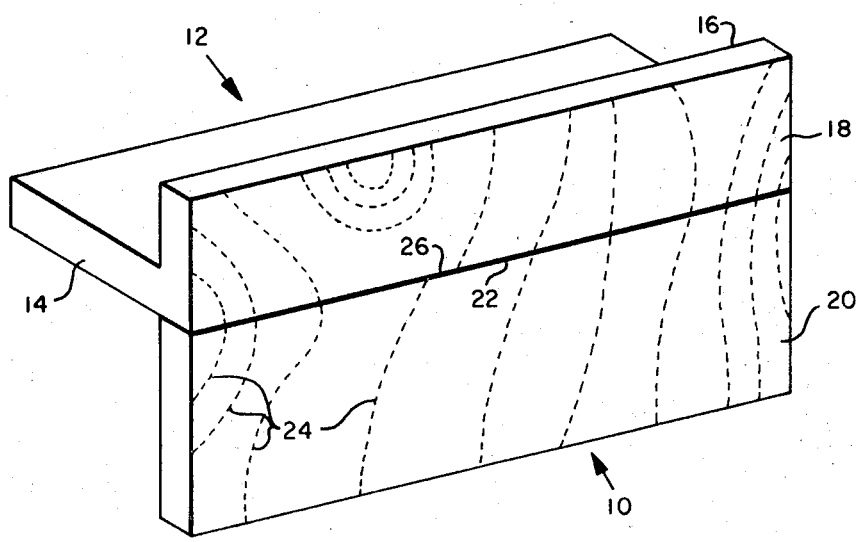
FIG. 1 is a perspective view of a pair of metal plates which are welded together, illustrating the fringe lines which are visible as a result of practice of the method of the present invention.

Referring to the drawings, FIG. 1 illustrates a pair of plates 10 and 12 which have been welded together, and illustrates the results achieved upon analyzing that weld through use of the method and apparatus of the present invention.

The plate 10 is formed of steel cut into a rectangular shape and has an appreciable thickness. The plate 12 is formed of the same material and has a 90° bend formed along its length so as to comprise a planar section 14 and an extending section 16 which projects normally to the surface 14. The plates have been disposed with one edge of the plate 10 in abutment to the lower side of the plate 12 so as to create a common surface 18 and 20 and have been welded along their line of abutment 22.

In order to test the continuity of the weld, the method of the present invention, as hereinafter described, has been applied. Upon visual examination of the optical image of the members 10 and 12 from a hologram formed of the common surface 18 and 20 while the members are vibrated, a plurality of fringe lines 24 appear. If the members 10 and 12 are fully welded along the line 22, they will vibrate as an integral plate; otherwise, they will develop independent modes of vibration. The fringe lines 24 represent nodes of the vibration pattern set up in the surface 18–20, and a continuity of the fringe lines across the interface 22 indicates a good weld while a discontinuity indicates that the members are vibrating separately and the weld is broken. The fringe pattern 24 set up in the surface 18–20 is continuous, except at 26. The discontinuity at that point indicates an imperfect weld.

In order to cause the surface 18–20 to vibrate, in the practice of the present method, it would be necessary to induce vibrations from some external source. Method of accomplishing this will be subsequently described.

Figure 2:
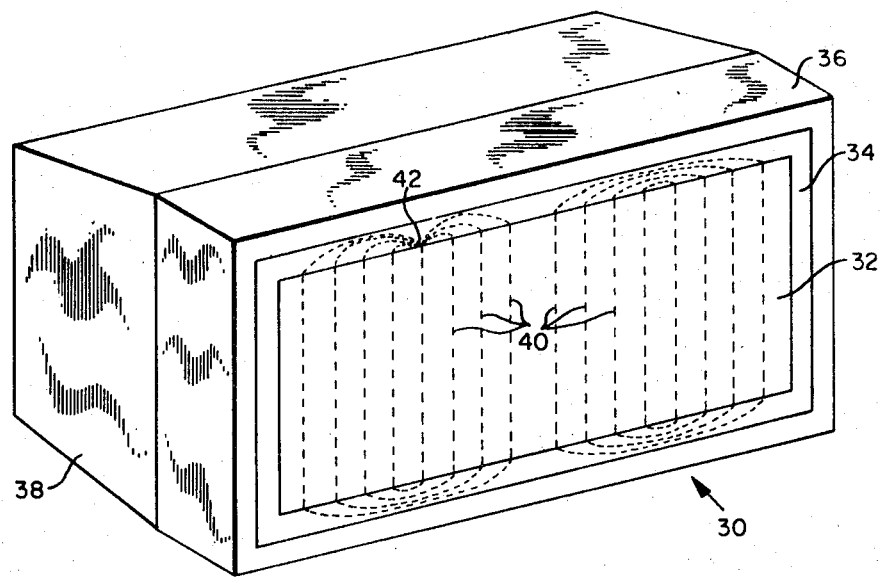
FIG. 2 is a perspective view of a sonic transducer, illustrating the fringe lines which are made visible by practice of the method of the present invention.

The device of FIG. 2, generally indicated at 30, constitutes an electrosonic transducer, and it is not necessary to provide an external vibrating source in order to practice the method of the present invention. The transducer includes a vibrating surface plate 32 which is surrounded by a rectangular rubber gasket 34. The gasket is firmly retained between a rectangular aperture in the housing 36 and the plate 32. The vibrating mechanism 38 is supported to the rear of the housing. The inner edge of the rubber gasket 34 is intended to be securely bonded to the outer side of the plate 32 by appropriate adhesives. In order to test the continuity of that bond the cover plate is vibrated; a hologram is made; and the hologram is illuminated and viewed to observe an optical reconstruction of the plate 32 and the surrounding gasket 34.

Such reconstruction makes visible fringe lines 40. The continuity of the fringe lines 40 in the plate 32 and in the gasket 34 are observed and it is noted that a discontinuity exists at the point 42, indicating an improper bond at that point.

Figure 3:
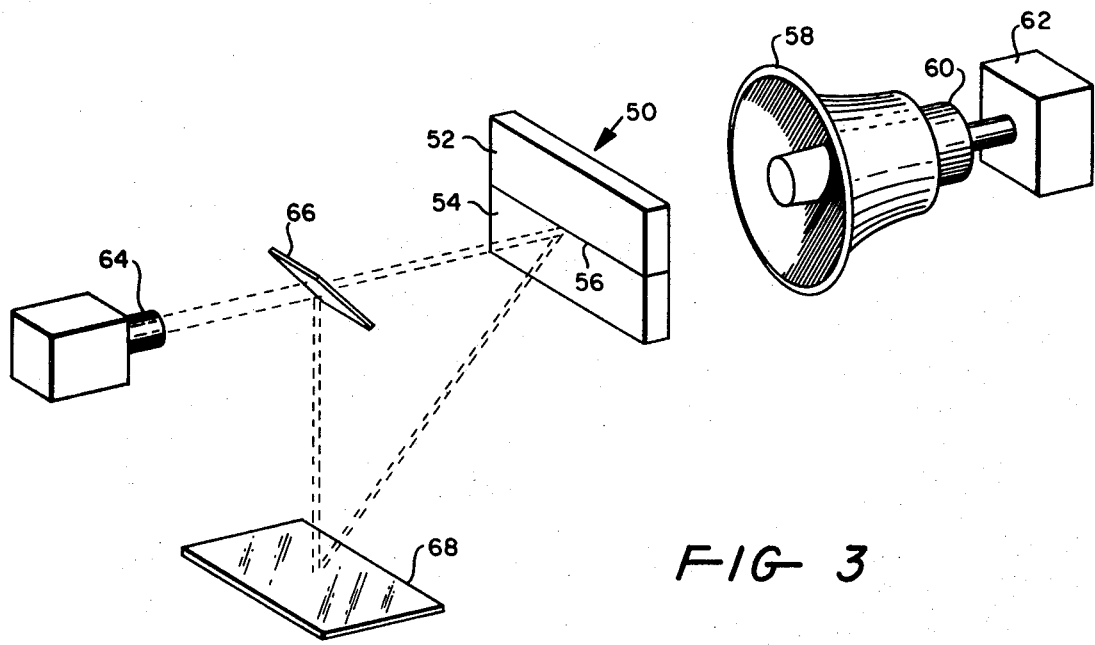
FIG. 3 is a schematic view of apparatus arranged to form a hologram of a vibrating member.

FIG. 3 illustrates the practice of the present invention on a specimen generally indicated at 50 which consists of a pair of rectangular plates 52 and 54, welded together along a line 56. In order to induce vibrations in the specimen, a sonic transducer 58 is positioned to the rear of the specimen. The voice coil 60 of the speaker is appropriately energized from a variable frequency audio source 62. The positioning of the speaker with respect to the specimen 50 is such as to cause it to vibrate. In certain cases it may be necessary to couple the sonic generator and the test specimen with a more dense fluid, such as water. In such cases a waterproof sonic generator would be disposed in the fluid and one surface of the test specimen is immersed in the fluid. Alternatively, it would be possible to use methods of underwater holography to immerse the entire specimen.

In the preferred embodiment the hologram is formed by illuminating the surface of the specimen, including the interface 56, with light from a laser source 64. The light is passed through a half-silvered mirror 66, to reflect a portion of the beam directly to the photosensitive surface of a photographic plate 68. Light from the laser illuminated surface of the test specimen 50 is also reflected to the photosensitive surface of the plate 68. The length of exposure of the plate must be sufficient for the member 50 to undergo at least one, and preferably several vibrations.

Figure 4:
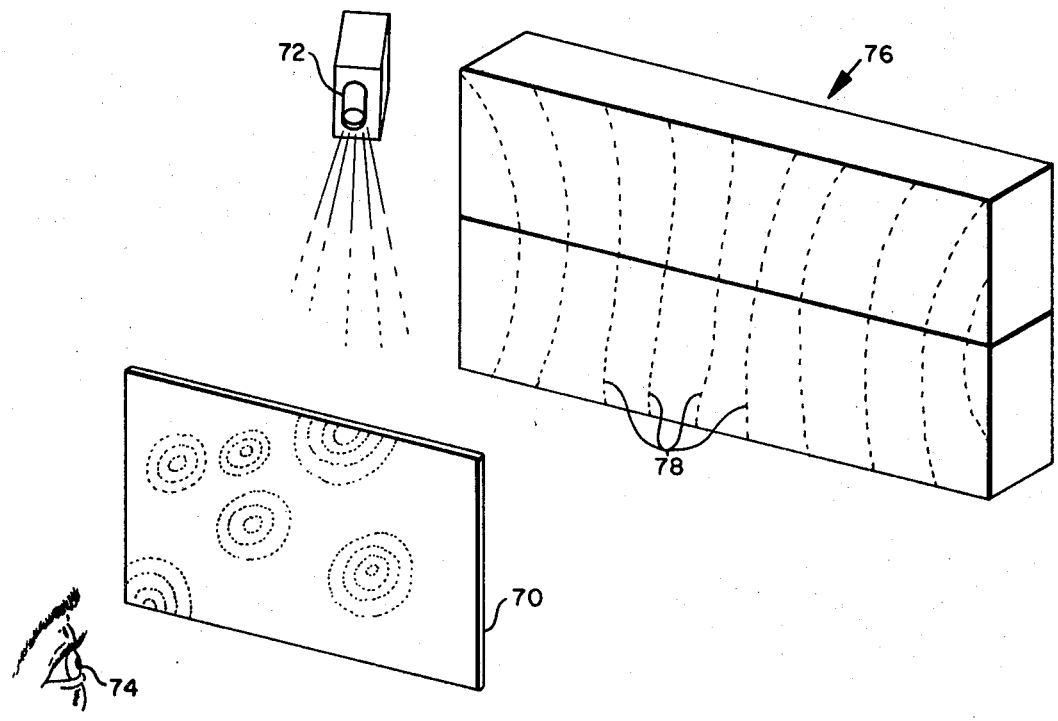
FIG. 4 is a schematic view of the method of observing the optical reconstruction of the vibrating member through the hologram.

Following the exposure of the plate 68 it is developed in a conventional manner to produce a hologram 70 (FIG. 4) which constitutes a photographic record of the lines of interference between the direct light from the laser 64, via the mirror 54, and light reflected from the illuminated surface to the test specimen 50. The hologram 70 is illuminated by a laser 72 positioned with respect to the hologram as the mirror 66 is positioned with respect to the photographic plate 68. An observer 74 positioned in the opposite side of the hologram and looking through it will observe a virtual image 76 which is the optical equivalent of the specimen 50. Not only does it exhibit a stereo depth effect, but a movement of the observer's head produces a shifting of the surfaces of the image 76 with respect to one another and reveals and hides various surfaces. In addition to containing all the observable optical properties of the member 50, this image contains a plurality of fringe lines 78. Again, the continuity of the fringe lines across the optical reproduction of the interface constitutes a test of the bond along the interface.

Figure 5:
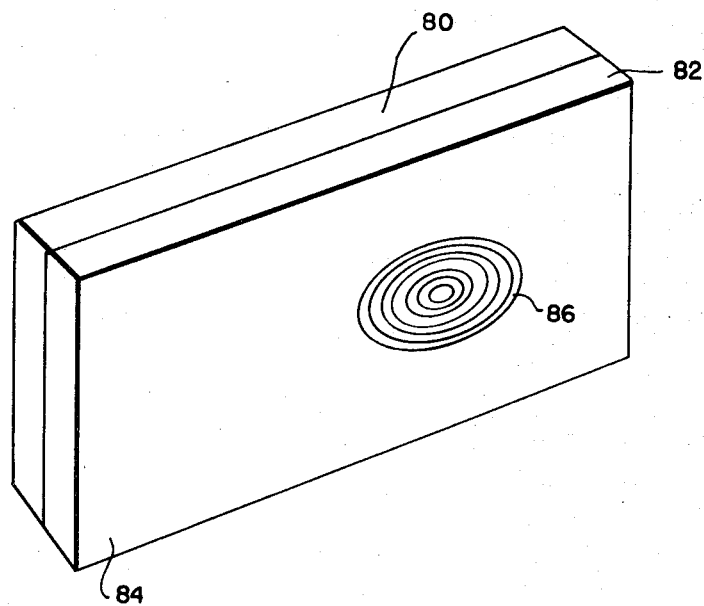
FIG. 5 is a perspective view of a member so constructed that the bond to be analyzed must be studied from a surface which does not contain the interface, with a fringe pattern shown which is made visible by practice of the present invention.

The method is equally useful where the bond to be analyzed does not occur at a surface. In such cases the analysis is based on the holographic study of a surface which is so related to the bond that specific surface areas may be associated with particular areas of the bond. Such an object is illustrated in FIG. 5 and takes the form of a pair of rectangular plates 80 and 82, of similar shape, which are bonded together along one of their faces. While a holographic study of one of the edges of the assembly which contains the interface between the two members might reveal discontinuities in the bond between the members at the points studied, in order to uncover failures of the bond in areas deep within the member it is necessary to make a holographic study of a surface such as that denominated as 84 in FIG. 5 which represents the surface of the member 82 opposite to that which is bonded to the member 80. Since the surface 84 lies parallel to the bonded surface, if vibration is induced in the member 82, from the member 80, through the interface between the members, the vibration pattern of the member 84 will depend upon the condition of the bond between the members. Likewise, if a vibration is induced in member 84 by other means, the member 84 may be considered as being supported by the juncture between the two members so that an imperfect area of the bond will be reflected in an unusual vibration of the associated area of the surface 84.

In order to test the bond vibrations are induced in the assembly in an appropriate manner and a holographic study of surface 84 is made in the same manner as previously described. FIG. 5 illustrates a set of fringe lines 86 which may result from an incomplete bond between the members 80 and 82 at a point on their interface directly beneath the center of the fringe pattern 86.

A fringe pattern such as 86 occurs when the center of the fringe pattern vibrates but the rest of the surface 84 does not. This may occur when vibrations of a frequency which will excite any improperly bonded areas, but not properly bonded areas, is induced in the member. Various methods of analysis, such as real time holography, or simply formation of holograms at a number of spaced frequencies may be used to determine frequencies which will excite a discontinuous section of a particular member. Afterwards, vibrations of this particular frequency may be induced in similar members, and holograms made in accordance with the process of the present invention, in order to nondestructively analyze the bonds in such members.

It is apparent that the method of the present invention may be readily used to nondestructively analyze the presence or absence of bond in a wide variety of structures. The scope of the inventive method and apparatus should be considered to be limited only in accordance with the following claims:

I claim:

1. The method of analyzing the bond between a pair of members which abut one another at a joinder, comprising; inducing vibrations in the members; forming a hologram of a section of a surface of the members while they are undergoing vibration; and illuminating the hologram and viewing a reconstructed optical image of said surface section of the members, and identifying nonuniform fringe lines, such image displaying families of fringe lines which are generally uniform in areas associated with points of the joinder where the members are bonded to one another and are nonuniform in areas associated with other points of the joinder.

2. The method of claim 1 wherein the section of surface of which the hologram is formed includes a line of the joinder of the pair of members and the families of fringe lines which are displayed on the image are continuous across the line of joinder at points where the members are bonded to one another and are discontinuous at other points across the line of joinder.

3. The method of claim 1 wherein one of the pair of abutting members constitutes the diaphragm of a sonic transducer and vibrations are induced in the members by energizing the transducer.

4. The method of claim 1 wherein the members are caused to vibrate by contacting them with a vibrating transducer.

5. The method of claim 1 wherein the members are caused to vibrate by inducing the vibrations into a fluid medium contacting the members.

6. The method of claim 1 wherein the hologram of the vibrating members is made by exposing a photographic plate to light from a coherent source which arrives at the plate directly and by reflection from said surface of the members and developing the photographic plate.

7. The method of claim 6 wherein the photographic plate is exposed for periods sufficient for the members to undergo a plurality of vibrations.

8. The method of claim 6 wherein the hologram is viewed by illuminating one side of it with a coherent light source and observing through the other side.

* * * * *